United States Patent
Hodge

(10) Patent No.: US 11,778,417 B2
(45) Date of Patent: Oct. 3, 2023

(54) SYSTEM AND METHOD FOR DETECTING AND LOCATING CONTRABAND DEVICES IN A SECURE ENVIRONMENT

(71) Applicant: **GLOBAL TEL*LINK CORP.**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 17/876,019

(22) Filed: Jul. 28, 2022

(65) Prior Publication Data

US 2023/0022557 A1     Jan. 26, 2023

Related U.S. Application Data

(63) Continuation of application No. 16/835,601, filed on Mar. 31, 2020, now Pat. No. 11,405,750, which is a
(Continued)

(51) Int. Cl.
| | |
|---|---|
| *H04W 40/24* | (2009.01) |
| *H04L 67/55* | (2022.01) |
| *H04W 4/02* | (2018.01) |

(52) U.S. Cl.
CPC ............ *H04W 4/023* (2013.01); *H04L 67/55* (2022.05); *H04W 40/244* (2013.01)

(58) Field of Classification Search
None
See application file for complete search history.

(56) References Cited

U.S. PATENT DOCUMENTS

| | | |
|---|---|---|
| 4,136,764 A | 1/1979 | Johnson |
| 4,598,810 A | 7/1986 | Shore et al. |
| | (Continued) | |

FOREIGN PATENT DOCUMENTS

| | | |
|---|---|---|
| EP | 0159359 A1 | 10/1985 |
| EP | 0239110 A2 | 9/1987 |
| | (Continued) | |

OTHER PUBLICATIONS

"Controlling Wireless Abuse in Restricted Areas", Cell Block Technologies, Inc., www.cell-block-r.com, Prison Review International, Apr. 2002.
(Continued)

*Primary Examiner* — Idowu O Osifade
(74) *Attorney, Agent, or Firm* — Sterne, Kessler, Goldstein & Fox P.L.L.C.

(57) ABSTRACT

There is a growing problem in correctional facilities in which contraband devices may be smuggled into a correctional facility. These devices are not subject to the typical monitoring and control provided by the inmate communication system provided by the correctional facility, and thus pose a significant security risk. The present disclosure provides details of a system and method that leverages the sanctioned mobile devices and the wireless infrastructure of the inmate communication system to scan for and triangulate the location of contraband devices. The mobile and wireless infrastructure devices scan for transmissions indicative of a contraband device and send alerts to each other and to a central monitoring system. The central monitoring system then leverages multiple alerts to determine a location of the contraband device using multiple triangulation techniques. The triangulation may also be performed by the mobile devices themselves.

20 Claims, 9 Drawing Sheets

Related U.S. Application Data continuation of application No. 16/272,618, filed on Feb. 11, 2019, now Pat. No. 10,681,495, which is a continuation of application No. 15/379,064, filed on Dec. 14, 2016, now Pat. No. 10,206,064.

(56) References Cited

U.S. PATENT DOCUMENTS

| | | | |
|---|---|---|---|
| 4,866,661 A | 9/1989 | de Prins | |
| 4,896,024 A | 1/1990 | Morello et al. | |
| 4,951,308 A | 8/1990 | Bishop et al. | |
| 5,172,829 A | 12/1992 | Dellicker | |
| 5,386,462 A | 1/1995 | Schlamp | |
| 5,678,200 A | 10/1997 | Levi | |
| 5,744,933 A | 4/1998 | Inoue et al. | |
| 5,819,981 A | 10/1998 | Cox | |
| 5,940,764 A | 8/1999 | Mikami | |
| 6,064,886 A | 5/2000 | Perez et al. | |
| 6,201,973 B1 | 3/2001 | Kowaguchi | |
| 6,496,703 B1 | 12/2002 | da Silva | |
| 6,799,052 B2 | 9/2004 | Agness et al. | |
| 6,799,084 B2 | 9/2004 | Grobler | |
| 6,830,160 B2 | 12/2004 | Risolia | |
| 6,866,193 B1 | 3/2005 | Shimizu et al. | |
| 6,880,754 B1 | 4/2005 | Lie-Nielsen et al. | |
| 6,896,145 B2 | 5/2005 | Higgins et al. | |
| 6,975,941 B1 | 12/2005 | Lau et al. | |
| 7,142,108 B2 | 11/2006 | Diener et al. | |
| 7,233,916 B2 | 6/2007 | Schultz | |
| 8,019,354 B2 | 9/2011 | Rae et al. | |
| 8,078,190 B2 | 12/2011 | Noonan et al. | |
| 8,099,080 B1 | 1/2012 | Rae et al. | |
| 8,106,752 B2 | 1/2012 | Golden | |
| 8,175,577 B1 | 5/2012 | Harvey et al. | |
| 8,233,880 B2 | 7/2012 | Johnson et al. | |
| 8,238,936 B2 | 8/2012 | Nadler et al. | |
| 8,248,238 B2 | 8/2012 | Butler et al. | |
| 8,254,886 B2 | 8/2012 | Salkini et al. | |
| 8,311,892 B2 | 11/2012 | Junger | |
| 8,346,281 B2 | 1/2013 | Noonan et al. | |
| 8,365,868 B2 | 2/2013 | Johnson et al. | |
| 8,421,630 B2 | 4/2013 | Butler et al. | |
| 8,509,740 B2 | 8/2013 | Salkini et al. | |
| 8,509,818 B2 | 8/2013 | Schork et al. | |
| 8,583,078 B2 | 11/2013 | Sweeney et al. | |
| 8,606,229 B2 | 12/2013 | Johnson et al. | |
| 8,626,195 B2 | 1/2014 | Noonan et al. | |
| 8,750,903 B1 | 6/2014 | Fitzsimmons et al. | |
| 8,825,011 B2 | 9/2014 | Salkini et al. | |
| 8,981,925 B2 | 3/2015 | Chapin et al. | |
| 8,983,446 B2 | 3/2015 | Nadler et al. | |
| 9,295,071 B2 | 3/2016 | Salkini et al. | |
| 9,301,102 B2 | 3/2016 | Noonan et al. | |
| 9,313,639 B2 | 4/2016 | Salkini et al. | |
| 9,332,412 B2 | 5/2016 | Salkini et al. | |
| 9,332,520 B2 | 5/2016 | Nadler et al. | |
| 9,355,515 B2 | 5/2016 | Brahami et al. | |
| 9,444,574 B2 | 9/2016 | Johnson | |
| 9,508,212 B2 | 11/2016 | Peters et al. | |
| 9,584,252 B1 | 2/2017 | Salyers et al. | |
| 9,681,360 B1 | 6/2017 | Salyers et al. | |
| 9,729,709 B1 * | 8/2017 | Edwards | H04W 4/023 |
| 9,887,800 B2 | 2/2018 | Johnson | |
| 9,900,428 B1 | 2/2018 | Hodge et al. | |
| 10,187,519 B2 | 1/2019 | Hodge | |
| 10,206,064 B2 | 2/2019 | Hodge | |
| 10,560,497 B1 | 2/2020 | Smith | |
| 10,681,495 B2 | 6/2020 | Hodge | |
| 2001/0036821 A1 | 11/2001 | Gainsboro et al. | |
| 2001/0041987 A1 | 11/2001 | Ichikawa | |
| 2002/0036995 A1 | 3/2002 | Dalsgaard | |
| 2002/0094780 A1 | 7/2002 | Payton et al. | |
| 2002/0116208 A1 | 8/2002 | Chirnomas | |
| 2003/0017821 A1 | 1/2003 | Irvin | |
| 2003/0030539 A1 | 2/2003 | McGarry et al. | |
| 2003/0143943 A1 | 7/2003 | Kline | |
| 2004/0044697 A1 | 3/2004 | Nixon | |
| 2005/0060246 A1 | 3/2005 | Lastinger et al. | |
| 2005/0211768 A1 | 9/2005 | Stillman | |
| 2006/0079218 A1 | 4/2006 | Aldridge et al. | |
| 2006/0165217 A1 | 7/2006 | Skatter | |
| 2007/0041545 A1 | 2/2007 | Gainsboro | |
| 2007/0041581 A1 | 2/2007 | Frost | |
| 2007/0050271 A1 | 3/2007 | Ufford et al. | |
| 2007/0099667 A1 | 5/2007 | Graham et al. | |
| 2007/0159991 A1 | 7/2007 | Noonan et al. | |
| 2008/0005225 A1 | 1/2008 | Ferguson et al. | |
| 2008/0043993 A1 | 2/2008 | Johnson | |
| 2008/0057976 A1 | 3/2008 | Rae et al. | |
| 2008/0058985 A1 | 3/2008 | Alcov | |
| 2008/0168515 A1 | 7/2008 | Benson et al. | |
| 2010/0105416 A1 | 4/2010 | Nadler et al. | |
| 2010/0151820 A1 | 6/2010 | Mulherin et al. | |
| 2011/0092245 A1 | 4/2011 | Noonan et al. | |
| 2011/0093622 A1 | 4/2011 | Hahn et al. | |
| 2011/0258135 A1 | 10/2011 | Paul et al. | |
| 2012/0040650 A1 | 2/2012 | Rosen | |
| 2012/0078413 A1 | 3/2012 | Baker | |
| 2012/0215347 A1 | 8/2012 | Illingworth et al. | |
| 2012/0248183 A1 | 10/2012 | Cook | |
| 2012/0295646 A1 | 11/2012 | Johnson | |
| 2013/0036018 A1 | 2/2013 | Dickerson | |
| 2013/0307533 A1 | 11/2013 | Keene et al. | |
| 2014/0018059 A1 | 1/2014 | Noonan | |
| 2014/0066012 A1 | 3/2014 | Sweeney et al. | |
| 2014/0120827 A1 | 5/2014 | Johnson | |
| 2014/0128023 A1 | 5/2014 | Guerra | |
| 2014/0148947 A1 | 5/2014 | Levesque et al. | |
| 2014/0194084 A1 | 7/2014 | Noonan et al. | |
| 2014/0253322 A1 | 9/2014 | Chapin et al. | |
| 2014/0297487 A1 | 10/2014 | Bashkin | |
| 2014/0330682 A1 | 11/2014 | Knight | |
| 2014/0344116 A1 | 11/2014 | Paracha et al. | |
| 2014/0367466 A1 | 12/2014 | Pai et al. | |
| 2015/0054639 A1 | 2/2015 | Noonan | |
| 2015/0069174 A1 | 3/2015 | Wang et al. | |
| 2015/0077221 A1 | 3/2015 | Peters et al. | |
| 2015/0079935 A1 | 3/2015 | Maguire et al. | |
| 2015/0225072 A1 | 8/2015 | Torre | |
| 2015/0279147 A1 | 10/2015 | Illingworth et al. | |
| 2015/0341748 A1 * | 11/2015 | Daly | H04W 4/029 455/456.6 |
| 2015/0356801 A1 | 12/2015 | Nitu et al. | |
| 2015/0363749 A1 | 12/2015 | Buscher et al. | |
| 2016/0006922 A1 | 1/2016 | Boudreau et al. | |
| 2016/0099590 A1 | 4/2016 | Velderman et al. | |
| 2016/0180632 A1 | 6/2016 | Santana et al. | |
| 2016/0300409 A1 | 10/2016 | Peters et al. | |
| 2016/0328979 A1 | 11/2016 | Postrel | |
| 2016/0380718 A1 | 12/2016 | Johnson | |
| 2017/0048679 A1 | 2/2017 | Zhang et al. | |
| 2017/0094520 A1 | 3/2017 | Salyers et al. | |
| 2017/0094521 A1 | 3/2017 | Salyers et al. | |
| 2017/0094534 A1 | 3/2017 | Salyers et al. | |
| 2017/0261604 A1 | 9/2017 | Van Voorst | |
| 2017/0286649 A1 | 10/2017 | Lowenthal et al. | |
| 2017/0287295 A1 | 10/2017 | Aswath et al. | |
| 2017/0345248 A1 | 11/2017 | Peters et al. | |
| 2017/0358169 A1 | 12/2017 | Peters et al. | |
| 2018/0062784 A1 | 3/2018 | Hodge | |
| 2018/0062785 A1 | 3/2018 | Hodge | |
| 2018/0062786 A1 | 3/2018 | Hodge | |
| 2018/0097931 A1 | 4/2018 | Hodge | |
| 2018/0159653 A1 | 6/2018 | Johnson | |
| 2018/0167774 A1 | 6/2018 | Hodge | |
| 2018/0295562 A1 | 10/2018 | Hodge | |
| 2019/0191359 A1 * | 6/2019 | Noonan | B01J 35/1042 |
| 2020/0267500 A1 | 8/2020 | Hodge | |

FOREIGN PATENT DOCUMENTS

| | | |
|---|---|---|
| EP | 2182752 A1 | 5/2010 |
| EP | 2328130 A1 | 1/2011 |
| EP | 3032883 A2 | 6/2016 |

(56) References Cited

FOREIGN PATENT DOCUMENTS

| WO | WO 2007/137067 A2 | 11/2007 |
|---|---|---|
| WO | WO 2008/073566 A2 | 6/2008 |
| WO | WO 2012/174324 A1 | 12/2012 |

OTHER PUBLICATIONS

"No More 'Cell' Phones," TECHbeat, Winter 2005.
Cellbuster Cell Phone Detector, Cellbusters Mobile Security Products, cellbusters.com, Phoenix, Arizona, available Aug. 16, 2006.
Efstathiou et al., "The Mobile-Phone Silencers Controversy," Jan. 2002, Athens: Athens University of Economics and Business, Department of Computer Science, Mobile Multimedia Library, Jan. 2002; 4 pages.
Excerpts from the Prosecution History of U.S. Appl. No. 11/504,979, filed Aug. 16, 2006.
Excerpts from the Prosecution History of U.S. Appl. No. 13/562,057, filed Jul. 30, 2012.
GSM Pocket Cellular Phone Detector, www.cellular.co.za, accessed Oct. 6, 2005.
Xu, et al., "The Feasibility of Launching and Detecting Jamming Attacks in Wireless Networks," Urbana-Champaign, IL, 2005, available at https://nslab.kaist.ac.kr/courses/2006/cs710/paperlist/security/35.pdf; 12 pages.
Miller et al. "Jail Vulnerability Assessment: A Systems Approach to Improve Safety and Security," National Institute of Corrections World Wide Web Site www.nicic.org, NIC Accession No. 000000, Dec. 31, 2008, [retrieved on Jun. 4, 2018], Retrieved from the Internet <URL: http://correction.org/wp-content/uploads/2014/10/Jail-Vulnerability-Assessment-JVA-Final-Draft.pdf> entire document.
International Search Report and Written Opinion of the International Searching Authority directed to International Patent Application No. PCT/US2017/046596, dated Dec. 7, 2017; 12 pages.
International Search Report and Written Opinion of the International Searching Authority directed to International Patent Application No. PCT/US2017/054974, dated Oct. 19, 2017; 10 pages.
International Search Report and Written Opinion of the International Searching Authority directed to related International Patent Application No. PCT/US2017/066428, dated Apr. 12, 2018; 12 pages.
International Search Report and Written Opinion of the International Searching Authority directed to International Patent Application No. PCT/US2018/027142, dated Jul. 16, 2018; 13 pages.
Supplementary European Search Report directed to related European Patent Application No. 17881364.8, dated Jun. 9, 2020; 8 pages.

* cited by examiner

SYSTEM AND METHOD FOR DETECTING AND LOCATING CONTRABAND DEVICES IN A SECURE ENVIRONMENT

CROSS-REFERENCE TO RELATED APPLICATIONS

This application is a continuation of U.S. patent application Ser. No. 16/835,601. Filed Mar. 31, 2022, which is a continuation of U.S. patent application Ser. No. 16/272,618, filed Feb. 11, 2019, now U.S. Pat. No. 10,681,495, which is a continuation application of U.S. application Ser. No. 15/379,064, filed on Dec. 14, 2016, now U.S. Pat. No. 10,206,064, each of which is incorporated by reference herein in its entirety.

BACKGROUND

Field

The disclosure relates to a system and method for detecting and locating contraband devices in a correctional facility utilizing mobile devices.

Background

In corrections environments such as prisons, telecommunications are highly monitored and controlled. Typically, a correctional facility makes use of an inmate communication system (ICS), sometimes called an inmate telecommunication system (ITS), that provides both the infrastructure for inmates to communicate with individuals outside of the facility and for correctional facility personnel to record, monitor and control these communications. To facilitate these communications, an ICS may deploy a wireless infrastructure within the correctional facility grounds and mobile devices sanctioned by the correctional facility to allow inmates to perform these communications.

Great lengths are taken to prevent the illicit use of the ICS. An ICS may be configured to record and monitor permitted inmate communications. Inmates are often subject to "whitelists" and "blacklists" that determine what parties the inmate is permitted to contact. There may be a time of day, a length of call, three-way call or other restrictions on calls, all of which may be controlled by way of various techniques and technologies that may include computer controlled equipment at the facility and/or at remote locations in addition to human monitoring and/or control.

While various aspects and alternative features are known in the field of communication monitoring, no one design has emerged that generally integrates all of the ideal features and performance characteristics as discussed herein.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
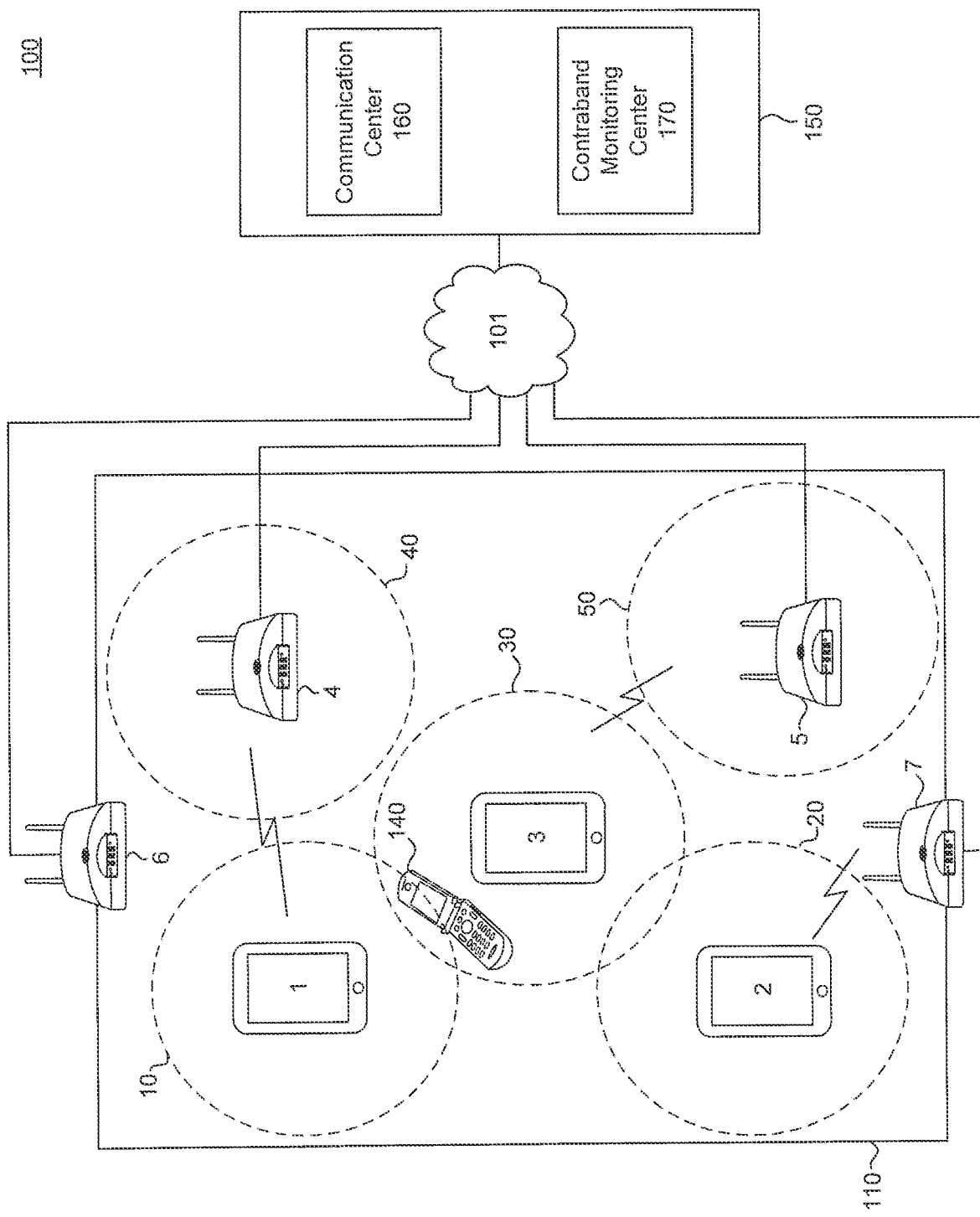
FIG. 1 illustrates a block diagram of a detection and monitoring system according to an exemplary embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Advances in communications technology have opened avenues for inmates to circumvent more traditional forms of monitoring that are typically available in correctional facilities. Maintaining the ability to ensure control and/or monitoring of communications from or to a controlled facility is, therefore, an important aspect to previously implemented telecommunications systems. With the advances in cellular communications technology, maintaining security is hindered by such issues as the smuggling of prohibited equipment into a monitored facility. Due to the small size of certain of the more recently-developed devices, such may avoid detection by more conventional search techniques including, but not limited to, walk through and manual metal detectors and even physical "pat-down" searches. Therefore, technologies are necessary to help correctional facility personnel determine the location or the user of the contraband device so that those devices may be confiscated and inmates that engage in such behavior may be disciplined.

Therefore, correctional facilities now have the need to detect, locate, and otherwise discourage the smuggling and use of "contraband" wireless and cellular devices. Due to the small size of certain of the more recently developed devices and the ingenuity of violating parties, such contraband devices may avoid detection by more conventional search techniques. Further, once a contraband device has been successfully smuggled into the correctional facility, the ability to stop the use of such devices is limited to wireless jamming techniques, as well as more traditional means such as receiving tips from other inmates and room searches. None of these techniques utilizes the technical capabilities of sanctioned devices within the correctional facility to automatically locate contraband devices.

In light of the above, the present disclosure provides details of a system and method for detecting and locating a contraband device by utilizing a combination of mobile devices, wireless access points, and a contraband monitoring center. The mobile devices include smart phones or tablets that are borrowed, rented, or purchased by an inmate from a correctional facility. These mobile devices are configured to detect, monitor, and intervene in the communications of contraband devices. Further, the mobile devices are configured to communicate with wireless access points located throughout the correctional facility in performing intervention operations. The contraband monitoring center may also be utilized in the coordination, monitoring, and intervention of contraband devices.

FIG. 1 illustrates a block diagram of a correctional facility and detection and monitoring scheme 100 within a correctional facility environment, according to embodiments of the present disclosure. In an exemplary embodiment, the system comprises mobile devices 1-3 and wireless access points 4-7 within the correctional facility grounds 110, a network 101, and a call processing center 150 comprising a communication center 160 and a contraband monitoring center 170. Within the correctional facility grounds 110, mobile devices 1-3 are devices which are issued by the correctional facility to facilitate inmate communications with individuals outside of the correctional facility environment. The mobile devices are configured to perform authorized communications with outside parties, including texting, audio, and video communication. The mobile device is also capable of accessing limited data services such as internet to law websites, music, and other services. These devices typically run proprietary software that is designed by the inmate communication system (ICS) provider and approved by the correctional facility.

As mentioned above, the correctional facility provides wireless connectivity to the mobile devices via wireless access points 4-7. In an exemplary embodiment, these devices employ the media access control (MAC) and physical (PHY) layer protocols associated with the IEEE 802.11 "WiFi" standard to serve the communications needs of the mobile devices within the facility. The mobile devices 1-3 form wireless connections with one of the wireless access points 4-7. Wireless access points 4-7 are deployed throughout the correctional facility. In embodiments, some of the wireless access points serve specific enclosed areas such as a room designated for voice or video call communications, a cafeteria, library, etc. In addition, some of the wireless access points 4-7 only serve as detecting devices for contraband devices as desired by the correctional facility. Such devices are placed in portions of the correctional facility in which mobile devices 1-3 are prohibited from entering. Thus, these devices serve to detect contraband devices which are smuggled into areas otherwise prohibited for wireless communications.

In an embodiment, any communications involving the mobile devices and parties outside the correctional facility are delivered using packetized data. The packetized data is routed through the wireless access points to the communication center 160 within the call processing center 150 via network 101. Voice communication is served over packetized voice protocols such as Voice over Internet Protocol (VoIP). Typical packetized data protocols such as transport control protocol/internet protocol (TCP/IP) serve mobile device data services such as restricted web-browsing or music. In other embodiments, the mobile devices connect to the communication center via wired communication links that use other common MAC and PHY layer protocols, such as those associated with the IEEE 802.3 "Ethernet" standard. These wired communication links are available in designated areas of the correctional facility such as a dedicated telecommunication room or a library.

In an exemplary embodiment, all communications from the mobile devices are routed through one of the access points 4-7 to a network 101. The network 101 includes a local area network (LAN), a wide area network (WAN), or the internet. Network 101 consists of routers and switches running well-known protocols such as 802.3 "Ethernet" protocol. The network may be owned and provisioned by the correctional facility 110, the ICS provider, or it may be part of a public network such as the internet. The network 101 serves to connect the correctional facility's local network infrastructure to a call processing center 150, which consists of a communication center 160 and a contraband monitoring center 170. These are described below in further detail.

The communication center 160 is responsible for monitoring the usage of the mobile devices for any signs of illicit behavior on the part of the inmate using the device. In voice communications, for example, the communication center is responsible for authenticating the inmate party and the outside party to ensure that these parties are allowed to communicate with each other. This will typically be done by comparing the inmate and the outside party to a "white list" or a "black list" of allowed or disallowed parties, such that inmates only communicate with parties on their white list or not on their black list. In embodiments, such lists are stored on the mobile devices themselves, such that when the mobile device is issued to a particular inmate, the inmate will only be allowed to contact their allowed parties. For data communications, both the communication center and the mobile devices themselves will typically be responsible for preventing the user of the mobile device from accessing prohibited data. In embodiments, this is done at the communication center, for example, by maintaining access control lists which list the internet web domains which are allowable for a particular mobile device. The mobile device employs proprietary application design, modifications to a standard mobile device operating system (OS), and hardware designed to prevent tampering with the mobile device to prevent unauthorized or disallowed communications.

Both the mobile devices 1-3 and wireless access points 4-7 are configured to detect and monitor unauthorized communications by a contraband device 140. In this capacity, both the mobile devices and wireless access points are referred to generally as "detecting devices" in the present disclosure. Examples of contraband device 140 include a cellular phone, an unauthorized network router, unauthorized hotspot, or unauthorized communication device, or an unmanned aerial vehicle (UAV) or "drone" device. To do this, devices 1-7 are configured to monitor different radio access technologies including, but not limited to, GSM, 2G-5G, WCDMA, CDMA, TDMA, UMTS, WIMAX, WIFI, IBEACON, Bluetooth, LTE, 700 mhz to 2200 mhz or other frequency bands, and/or other modes and frequencies. While monitoring a radio access technology, mobile devices 1-3 are configured to detect a transmission of a signal on the radio access technology from contraband device 140. For example, mobile device 1 may detect a transmitted LTE pilot signal from contraband device 140.

In an exemplary embodiment, the mobile devices 1-3 and wireless access points 4-7 are configured to perform broadband energy detection schemes over a large range of frequencies common in cellular technologies such as 700 MHz to 2200 MHz and 4.915-5.825 GHz bands. In embodiments, the mobile device employs a notch filter which prevents the detection scheme from detecting transmissions made by the mobile device itself. When a contraband signal is detected over a determined threshold anywhere within these bands, detecting devices 1-7 generate an alert or perform other actions to further confirm the presence of contraband device 140. For the mobile devices 1-3 in particular, this scanning can be initiated by correctional facility administrators, and does not depend on the state of the mobile device. Thus, scanning by the mobile devices 1-3 may be initiated even if the mobile device is in various operating states such as a low-power "sleep" mode, powered off, or otherwise because the software operating on these devices is modified to provide this functionality.

In some embodiments, the detecting devices 1-7 are coordinated to listen in "shifts" such that not all devices are listening at the same time, thereby allowing each device to conserve power. Thus, a detecting device employs a "wait time" between scans in which the device does not scan, where the wait time may span from zero seconds (i.e. continuous scanning) to several minutes. The contraband monitoring center determines a listening schedule dictating when each device should listen on the frequency bands of interest to search for contraband devices. This schedule reflects the current locations of the detecting devices, where devices within a small proximity of each other are scheduled so that only one device in the area is scanning at all times, but devices that are distant from each other may still be scheduled to scan simultaneously. In this way, continuous scanning coverage of as much of the correctional facility as possible is maintained while still conserving power on the detecting devices. In some embodiments the mobile devices 1-3 determine a listening schedule with each other with no input from the contraband monitoring center. The wireless access points 4-7 are more likely to perform continuous scanning because they typically do not run on a limited power resource.

In embodiments, when a contraband device is detected by either the mobile devices 1-3 or wireless access points 4-7, these devices send alerts to the contraband monitoring center 170 via the network 101. These alerts include details regarding the nature of the contraband detection, such as the detection time of a communication believed to originate from a contraband device, the location of the detecting device at the time of detection, received signal strength indicator (RSSI) information, an "angle of arrival" (AOA), a "time of arrival" (TOA), the location of the mobile device within the correctional facility such as "library" or "courtyard," and audio or video sample recorded upon time of the detection. Alerts from mobile devices are communicated to the contraband monitoring center via the same wireless access points 4-7, and alerts from the wireless access points themselves are also sent directly to the contraband monitoring center via the network 101. The mobile devices 1-3 also send updates of their respective locations to the contraband monitoring center 170. This will assist the contraband monitoring center 170 in contacting mobile devices when the center receives an alert, allowing the contraband monitoring center to send instructions for corrective actions or to collect more information to confirm the presence of a contraband device. For example, if an alert is received from a first mobile device, the contraband monitoring center sends instructions to other mobile devices in close proximity to the first mobile device to also scan the area to aide in providing a more accurate location of the contraband device.

In an embodiment, the contraband monitoring center listens for these alerts and uses the information in the alerts to perform triangulation operations that obtain the most probable location of the contraband device. Triangulation uses the location information of detecting devices and other information such as the detected signal power of the contraband device transmission to determine a likely location of the contraband device. Once the contraband device location is determined through the triangulation operation, the contraband monitoring center sends instructions for corrective actions to be taken as deemed necessary. For example, once the location of the contraband device is determined, the contraband monitoring center sends instructions to sanctioned mobile devices in the vicinity of the contraband device's location to transmit a wideband jamming signal to prevent the successful completion of the contraband device communications, or alerts the correctional facility to send personnel to search for the contraband device and apprehend the user of the contraband device. The detailed operations of the mobile devices, wireless access points, and the contraband monitoring center are described in greater detail below.

As discussed above, detecting devices 1-7 operate individually by detecting contraband device 140, transmitting alert information to contraband monitoring center 170, and performing intervening operations. However, in an embodiment, detecting devices 1-7 are also configured to operate in a mesh infrastructure where detecting devices 1-7 communicate with each other to detect contraband device 140 and perform intervening operations. Such embodiments are particularly useful in cases where connectivity to the contraband monitoring center 170 (or the call processing center 150 generally) has been compromised. In this embodiment, each of the detecting devices 1-7 acts as a node in a mesh infrastructure where each of the nodes communicates with and even instructs the other nodes to perform operations such as a jamming operation or a recording operation. For example, as shown by FIG. 1, if mobile device 1 detects contraband device 140, mobile device 1 communicates this information to one or more of the mobile devices 2-3 and instructs one or more of these devices to perform a corrective action against the contraband device. In a mesh infrastructure, mobile devices 1-3 are able to perform intervention operations without involvement of the contraband detection center 170.

In embodiments, the mobile devices 1-3 send alerts to one another and to wireless access points 4-7. In such cases, the mobile devices 1-3 may aggregate multiple alerts together to transmit to the contraband monitoring center in cases where wireless connectivity to the wireless access points is compromised for one or more of the mobile devices. In some embodiments, the mobile devices themselves perform a triangulation operation to determine the most probable location of the contraband device. In such cases, an alert sent to a contraband monitoring center also contains the contraband device location information determined on the mobile device.

In embodiments, the mobile devices 1-3, upon detecting a potential contraband device signal, begin recording audio and video samples of the surrounding area to potentially obtain biometric samples, or other samples that help identify the location of the device. This information is useful in potentially identifying the party that is using the contraband device, but also in helping identify the location of the device in cases where a more traditional method such as GPS is not available. For example, in doors a GPS signal is not typically available. A picture, and audio recording, or a video recording taken at the time of a detecting the potential contraband device signal may reveal the location of the detecting device, as well as the party or parties engaged with using the contraband device.

Mobile devices 1-3 and wireless access points 4-5 are also configured to intervene between unauthorized communications and contraband device 140. In an embodiment, intervention operations by mobile devices 1-3 include transmitting a jamming signal of low RF strength that radiates within predetermined areas 10, 20, 30, 40 and 50 around a location of the mobile devices 1-3 and wireless access points 4-5. Some wireless access points 6-7 may not have this capability. The predetermined areas 10, 20, 30, 40 and 50 are jamming signals that radiate 10-15 meters in all directions around the mobile devices 1-3. Jamming signals include a signal that interferes or blocks a detected frequency or a signal that associates with the detected frequency. For example, the jamming signal may interfere with the downlink signal that is associated with a detected uplink signal of a cellular phone. Jamming signals include signals that have an increased power or signals that include a predetermined number of transmissions that overpower unauthorized communications. Jamming signals may also include signals that corrupt unauthorized communications. For example, mobile devices 1-3 may analyze packet headers transmitted by the contraband device 140 and transmit a signal that overwrites portions of the unauthorized communication such that packets of the unauthorized communication become corrupted.

In an embodiment, jamming signals are configured to not interfere with communications between mobile devices 1-3 and an outside communication device. To do this, mobile devices 1-3 emit jamming signals having a frequency band and/or radio access technology that is different from the frequency band and/or radio access technology used for communication between the mobile devices 1-3 and communication center 160.

Jamming signals are activated based on the detection of contraband device 140 and/or instructions received from contraband monitoring center 170. In doing so, mobile devices 1-3 preserve battery power. While the jamming signal is described as being dependent on the detection of contraband device 140, the present application is not limited as so, and includes an always on mode where such detection of the contraband device and the subsequent activation of the jamming signal is always transmitted by the mobile devices 1-3. In this mode, at least one of mobile devices 1-3 are configured to transmit a jamming signal when a main operating system (OS) of the mobile device is powered on, in sleep mode, and/or powered off. In other words, in this mode, jamming features are operated independently of the main processor power of the mobile device.

Figure 2:
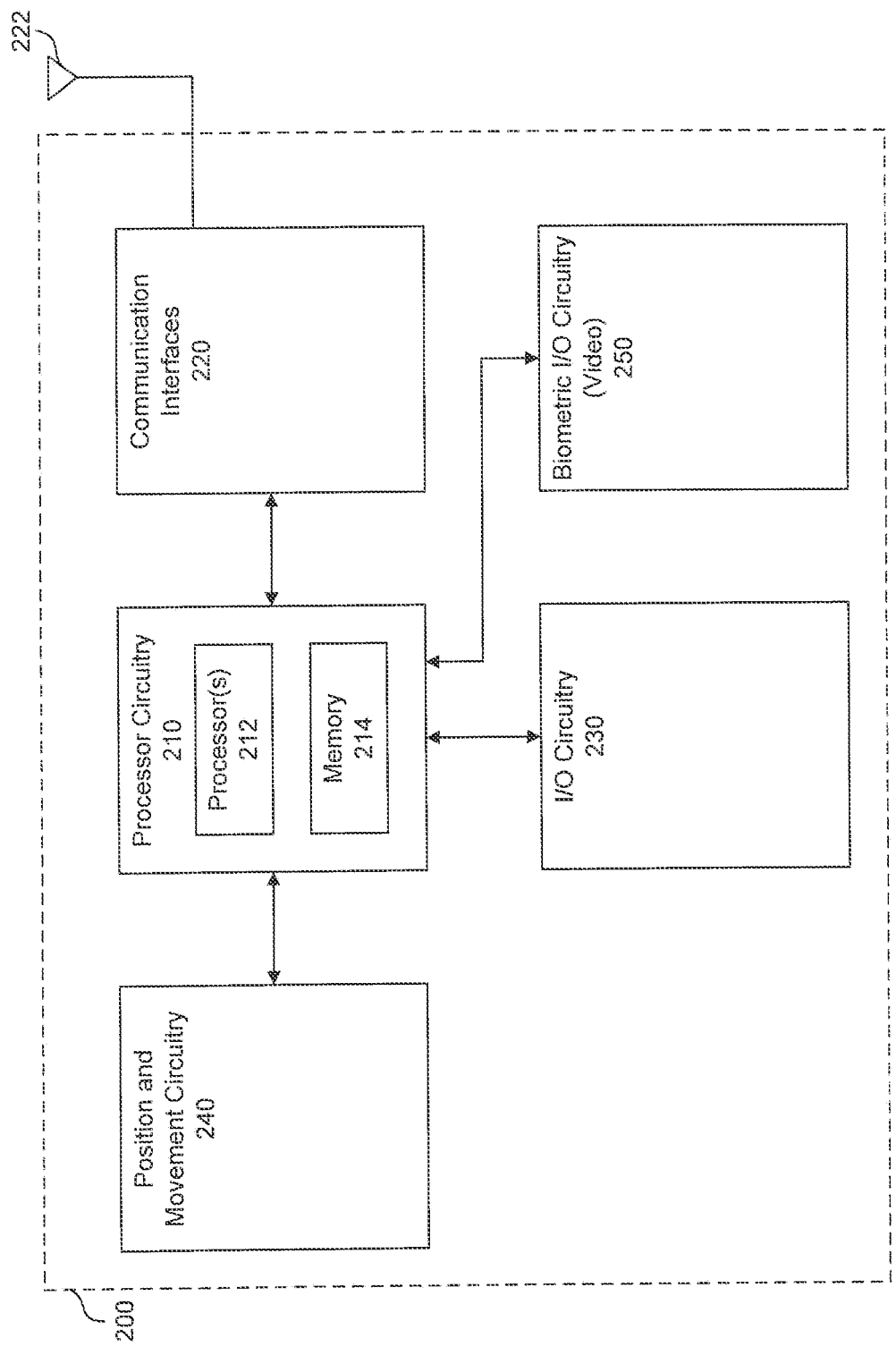
FIG. 2 illustrates a block diagram of a mobile device, according to an exemplary embodiment of the present disclosure.

FIG. 2 illustrates a block diagram of mobile device 200, according to embodiments of the present disclosure. Mobile device 200 may be an exemplary embodiment of one or more of mobile devices 1-3. Mobile device 200 includes processor circuitry 210 that is communicatively coupled to plurality of communication interfaces 220, input/output circuitry 230, and positional and motion circuitry 240. Processor circuitry 210 includes one or more processors 212, circuitry, and/or logic configured to control the overall operation of mobile device 200, including the operation of communication interfaces 220, input/output circuitry 230, and positional and motion circuitry 240. Processor circuitry 210 further includes memory 214 to store data and instructions. Memory 214 may be any well-known volatile and/or non-volatile memory that is removable and/or non-removable. In some embodiments, the processor circuitry 210 may store instructions for performing triangulation operations in certain embodiments. This allows the mobile device to perform triangulation operations based on the alert information received from other mobile devices, perform basic biometric comparisons between audio and video samples sent within those alerts, and so on.

Communication interfaces 220 include one or more transceivers, transmitters, and/or receivers that communicate via one or more antennas 222. Communication interfaces 220 are configured to transmit and receive communications between an inmate and an outsider via network 101. Communication interfaces 220 are also configured to detect transmissions by contraband device 140. Detection of contraband device 140 transmissions includes reception of a communication of an unauthorized communication via one or more antennas 222. For example, to detect an unauthorized communication, a receiver of the communication interface 220 may cycle through different frequencies bands and/or radio access technologies. Communication interfaces 220 are further configured to output an RF signal during intervention operations. For example, a transmitter of the communication interfaces 220 may be configured to transmit an interference signal based on the received unauthorized communication. Lastly, communication interfaces 220 is configured to communicate with other mobile devices 1-3, wireless access points 4-7, and/or contraband monitoring center 130 to provide or receive information and/or instructions.

Input/output circuitry 230 includes circuitry such as a keypad, a touch interface, a microphone, a camera, and a video screen for displaying information. In embodiments, input/output circuitry 230 is used for traditional mobile device communications such as audio, video, or texting communications. Biometric input/output circuitry 250 comprises circuitry such as the microphone and camera that are used during an intervention operation to capture audio and/or video of surrounding areas when an unauthorized communication is detected.

Positional and motion sensors 240 include circuitry for determining a current location and a change in location of mobile device 200. Positional and motion circuitry 240 may include such circuitry as Global Positioning System (GPS) technology, indoor positioning systems (IPS) technology, accelerometers, and/or gyroscopes to determine position and motion. Positional and motion sensors 240 are used to triangulate a first current location of mobile device 200 based on signals received from, for example, positioning systems. Positional and motion sensors 240 are configured to determine whether mobile device 200 is in motion based on second location of the mobile device 200 and determining whether a change of location occurred between the first current location and the second current location.

Figure 3:
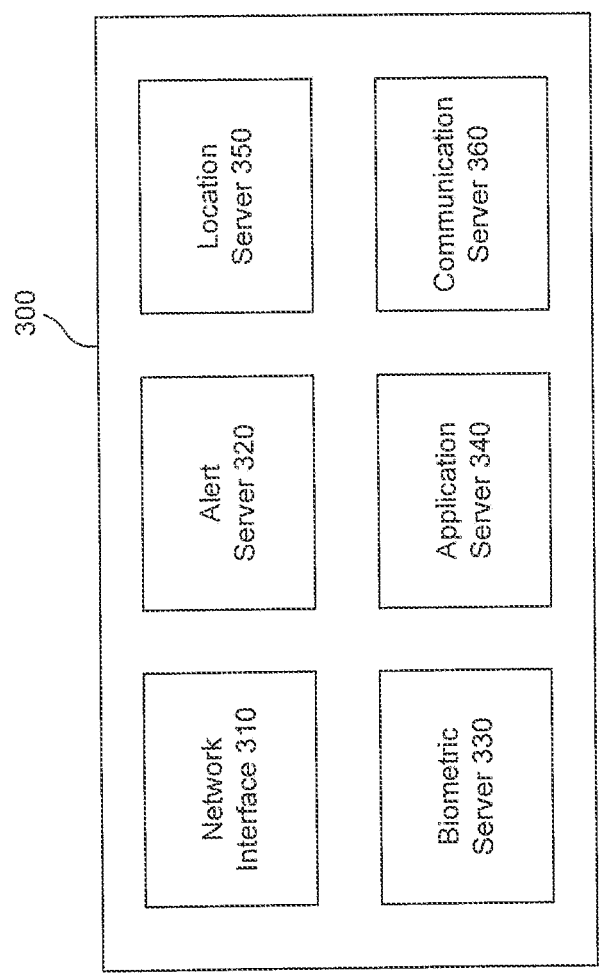
FIG. 3 illustrates a block diagram of a contraband monitoring center, according to an exemplary embodiment of the present disclosure.

FIG. 3 illustrates a block diagram of a contraband monitoring center 300, according to embodiments of the present disclosure. The contraband monitoring center 300 is an exemplary embodiment of the contraband monitoring center 170 depicted in FIG. 1. Contraband monitoring center 300 includes network interface 310, alert database 320, biometric database 330, application server 340, and communication server 350. The network interface 310 allows two-way communication with the wireless access points 4-7 and the mobile devices 1-3. This module allows the contraband monitoring center to receive alerts from the devices in the correctional facility, and send instructions to those devices in the event that corrective actions are necessary when a contraband device is detected. The module also allows the receiving of periodic location updates sent by the mobile devices 1-3. The information contained in the alerts, such as GPS coordinates, correctional facility location, audio or video samples for biometric identification, and so on are also received via this module, and the information will be distributed to the other servers within the contraband monitoring center. This module is implemented through common networking technology including an Ethernet card, modem, a communications port, a PCMCIA slot and card, etc.

The alert server 320 consists of any number of servers, and is configured to store the alert information received from any sanctioned device or wireless access point within the correctional facility. In embodiments, when an alert is received by the contraband monitoring center, the triangulation process for determining the location of the contraband device checks the alert database to see if similar alerts were received from other sanctioned devices in proximity to the most recently received alert. This may improve the accuracy of the location determined by the triangulation process. This database will also serve to keep alert histories for record keeping purposes.

Biometric server 330 consists of any number of servers, and is configured to store biometric data of inmates. Biometric data includes at least one of voice data, facial recognition data (2D or 3D), and device data. Biometric server 330 is configured to assist analyzing audio/video data received as part of the alert. In embodiments, biometric server 330 assists by comparing received audio/video data against stored biometric data to determine identities of those near a device at the time of detection. The server also compares the biometric data from multiple alerts to determine if those alerts all identify the same contraband device.

Location server 350 consists of any number of servers, and is configured to receive location data from one or more of mobile devices 1-3. In an embodiment, the mobile devices 1-3 send periodic updates of their location to the contraband monitoring center 170, and these updates are stored in the location server 350. The location data is used by location server 350 to determine a location and/or motion of a contraband device 140. In the event that an alert is received by a first mobile device, the location server is used to determine if other devices are in proximity to the first mobile device, and the contraband monitoring center then sends instructions to those devices to collect additional information. Location information is received by location server 350 based on one or more of a request to one or more of the detecting devices 1-7, a predetermined time for detecting devices 1-7 to communicate respective location and motion data, or based on an event performed by one of the detecting devices 1-7, for example detection of contraband device 140. It should be noted that the wireless access points 4-7 are less likely to update location information periodically because they are generally in fixed locations within the correctional facility. In an embodiment, location server 350 is further configured to provide the location to the application server so that the application server sends instructions to devices (e.g., mobile devices 1-3 and/or wireless access points 4-7) to perform corrective actions based on the received location information.

The communication server 360 consists of any number of servers, and is configured to communicate with parties either within or outside of the correctional facility when a contraband device 140 is detected. In some embodiments, these outside parties consist of law enforcement or other entities not necessarily associated with the correctional facility to alert them of the presence of contraband devices.

Finally, in embodiments the application server 340 is made up of one or more servers, and is the main server that performs triangulation operations as well as determining corrective actions to be taken in the event of a contraband device 140 being detected. In embodiments, this server operates as the main orchestrator between the other modules in the contraband monitoring center 300, querying information from the biometric server 330, alert server 320, and location server 350 to perform the necessary tasks of biometric validation, triangulation and determination of corrective actions when an alert is received by one of the detecting devices 1-7.

Figure 4:
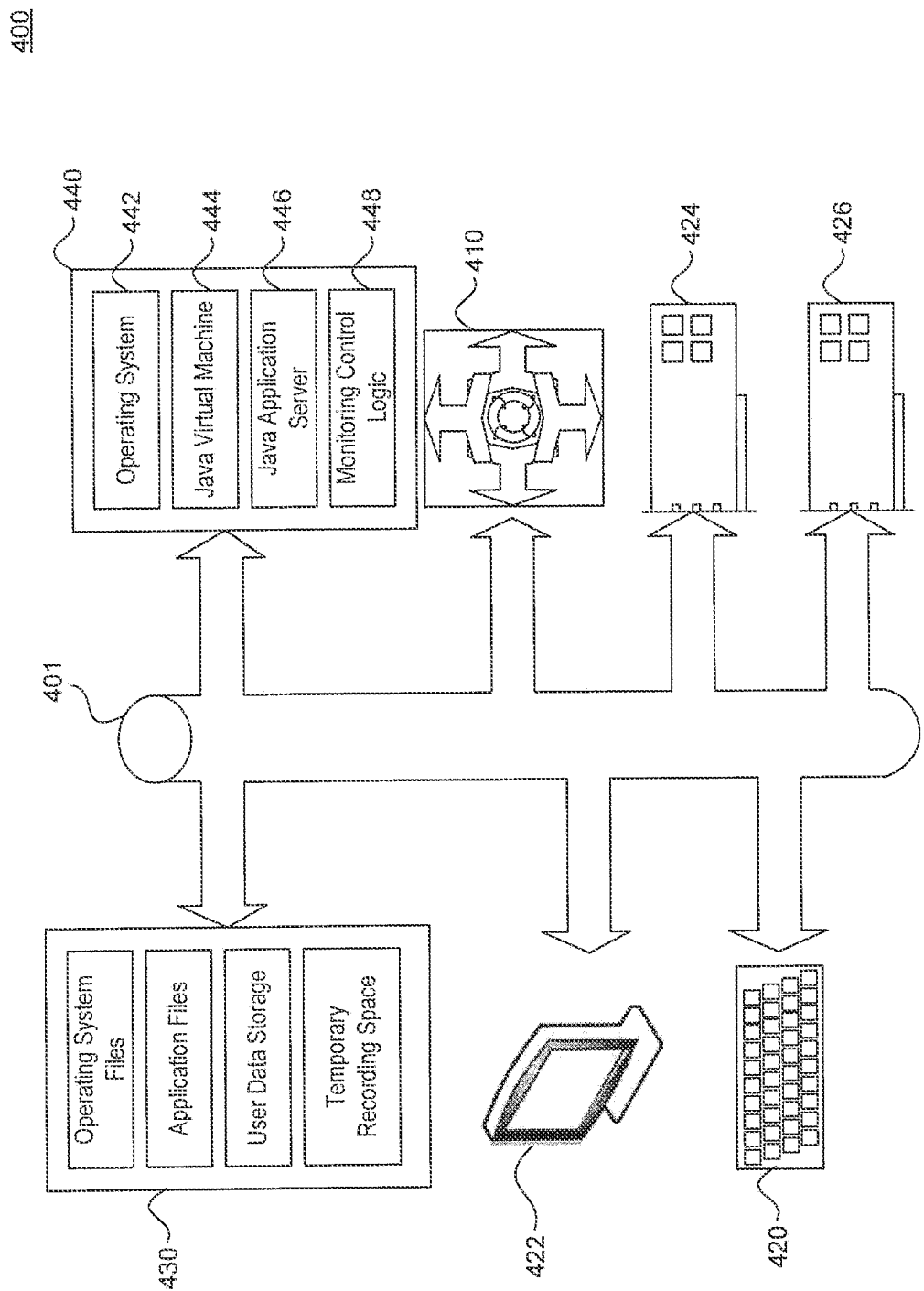
FIG. 4 illustrates a block diagram of an application server, according to an exemplary embodiment of the present disclosure.

FIG. 4 illustrates application server 400, according to exemplary embodiments of the present disclosure. Application server 400 is an exemplary embodiment of the application server 340 depicted in FIG. 3. Application server 400 consists of any number of servers, and functions as the primary logic processing center in detection and monitoring system 100 such as coordinating a response to detection of contraband device 140. Application server 400 is configured to manage and facilitate communication between communication server 360, location server 350, biometric server 330, and alert server 320.

Application server 400 includes one or more central processing units (CPU) 410 connected via a bus 401 to several other peripherals. Such peripherals include an input device, such as keyboard and/or mouse 420, monitor 422 for displaying information, network interface card 424 and/or modem 426 that provide network connectivity and communication.

Application server 400 also includes internal data storage 430. This data storage 430 is non-volatile storage, such as one or more magnetic hard disk drives (HDDs) and/or one or more solid state drives (SSDs). Data storage 430 is used to store a variety of important files, documents, or other digital information, such as operating system files, application files, user data, and/or temporary recording space.

Application server 400 also includes system memory 440. System memory 440 is preferably faster and more efficient than Data storage 430, and is configured as random access memory (RAM) in an embodiment. System memory 440 contains the runtime environment of application server 400, storing temporary data for any of operating system 442, java virtual machine 444, java application server 446, and detection and monitoring control logic 448.

Although the devices depicted with respect to detection and monitoring system 100 have been described in some detail with respect to FIGS. 1-4, the operations of these devices will be described in greater with respect to FIGS. 5-7. While FIGS. 5-6 contain methods of operation of detection and monitoring system 100, the operations are not limited to the order described below, and various operations may be performed in a different order. Further, two or more operations of each method may be performed simultaneously.

Figure 5:
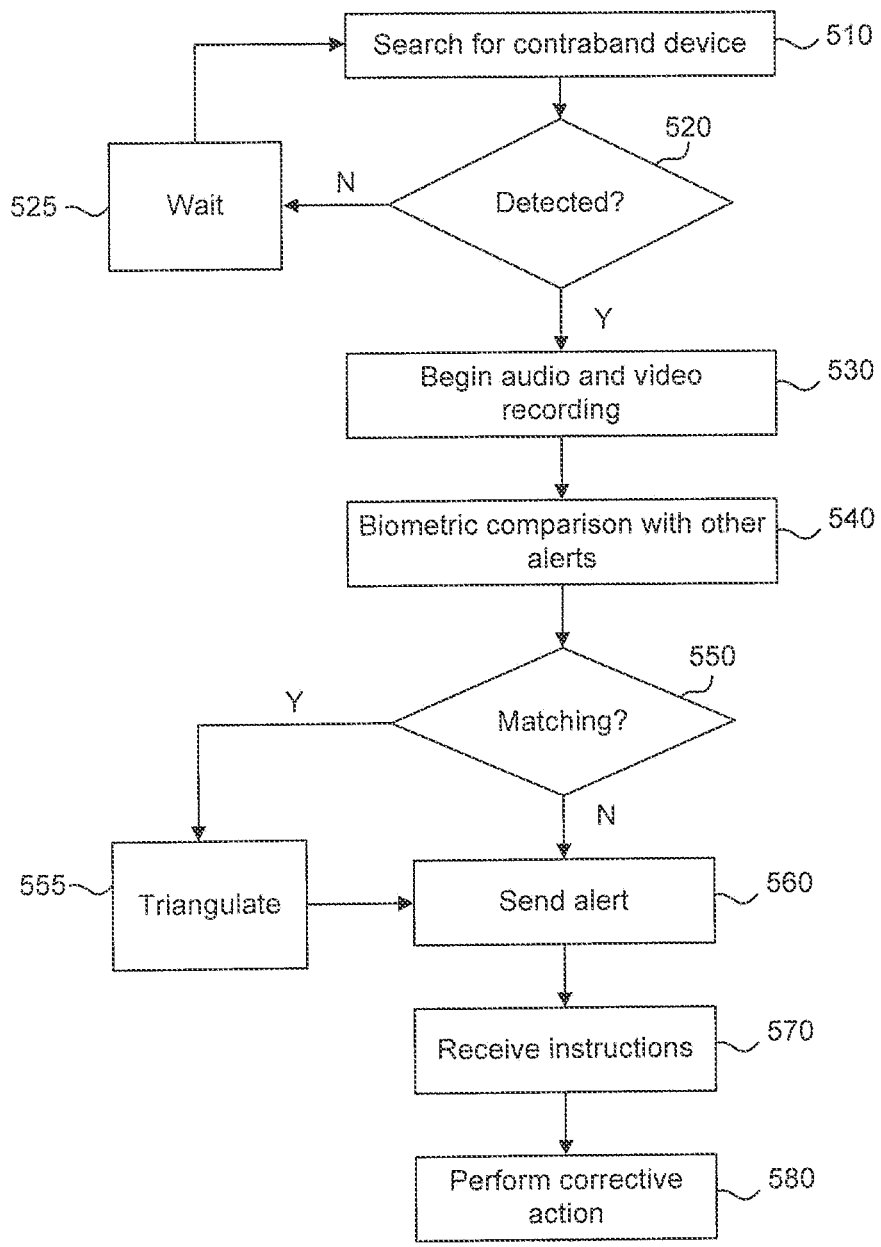
FIG. 5 illustrates the operational flow for a mobile device or wireless access point to detect a contraband device, according to an exemplary embodiment of the present disclosure.

FIG. 5 depicts a flowchart 500 of the operations performed by mobile devices 1-3 and wireless access points 4-7 to detect, monitor, and locate a contraband device 140 according to exemplary embodiments. In step 510, a detecting device searches for the contraband device. This search is performed by scanning over different network technologies such as LTE, UMTS, etc. or performing wideband energy detection over frequency bands of interest such as 700-2200 MHz, as described above. If, during this scanning operation, a signal indicative of a contraband device is not detected (520N), the detecting device progresses to step 525, in which the device begins a "wait time" during which it does not scan for a contraband device. During this wait time no scanning occurs to save power resources on the detecting device. In an embodiment, the mobile devices and wireless access points schedules the scanning operations such that not all of the devices are scanning at all times to conserve the power resources of the devices. The schedule is initiated by communication amongst the mobile devices or dictated to the mobile devices by the contraband monitoring center. This wait time may range from several minutes to zero seconds (i.e. the detecting device is always scanning). For the wireless access points 4-7, the wait time is more likely to be zero because these devices do not typically run on a finite power resource. As noted above, schedules are likely to be implemented amongst devices within a small proximity to each other or based on their location within the correctional facility.

In step 520, the scan performed in step 510 is examined. If a signal indicative of a contraband device is detected (520Y), operations to gather information, monitor, and locate the contraband device begin. From step 520Y, several steps are taken by the device depending on the detection methodologies desired by correctional facility or ICS provider administrators. In embodiments, several of the steps taken are optional or may not be taken at all depending on the conditions of the detection at step 510. Beginning with step 530, the mobile device or wireless access point initiates its biometric data collection apparatus, such as the biometric input/output circuitry 240 including a microphone and/or camera, to record sound and video images immediately following the detection to try to discern the party using the contraband device. This may be particularly useful in more closed off spaces such as an inmate cell block where sounds may be easier to record. The images are useful in not only identifying a party using the contraband device, but also the general location in which the detection occurs, especially if more specific location information such as GPS coordinates is not available.

As described above, in some embodiments, the steps of biometric validation and contraband device location via triangulation are performed by one or more of the devices 1-7 without any input from the contraband monitoring center 170. In these embodiments, the devices send each other alerts when a transmission indicative of a contraband device is detected, and each of the devices stores recent alerts received by other devices within a short time frame in order to aide in locating a contraband device. In such embodiments, the device performs a biometric comparison with information from other alerts as illustrated in step 540. In this step, using biometric techniques such as voice identification, facial recognition, and so on is performed by the mobile device to determine if previous alerts received by the device from other devices have similar or matching parties or conditions to the current contraband device detection. Alerts that indicate detections that have occurred too far in the past or at too far a distance from the device's current detection will be discarded.

In step 550, if the detecting device determines that it has received no alerts from other mobile devices that seem to indicate the same contraband device (550N), the detecting device sends an alert indicating that it has detected a likely contraband device in step 560.

In step 550, if the detecting device determines that its current contraband device detection and recently received alerts from other mobile devices indicate the same contraband device activity based on the biometric comparisons (550Y), the device performs a triangulation operation in step 555. The detecting device uses the best information available from its own detection and the recently received alerts to determine a probable location of the contraband device. Triangulation will be described in greater detail below and with reference to FIGS. 7A-C. If, at step 550, the detecting device determines that no useful alerts are available (550N), the detecting device progresses to step 560.

In step 560, the detecting device sends an alert indicating that it has detected a likely contraband device in step 560. In embodiments, the detecting device sends this alert to other devices in its vicinity and to the contraband monitoring center 170 via its connected wireless access point. As discussed above, the alert includes information related to the detection to aid the contraband monitoring center or other devices in determining the location of the contraband device. This information includes a timestamp that the detection occurred, the received signal strength indicator (RSSI), an "angle of arrival" (AOA), a time of arrival (TOA), the GPS coordinates of the detecting device, a known location of the detecting device within the correctional facility (e.g. "cafeteria", "library", etc.), the wireless access point serving the mobile device (or the wireless access point that performed the detection), and biometric audio or video samples gathered in step 530. In addition, if the detecting device has performed a triangulation operation as in step 555, this information will also be sent as part of the alert.

In step 570, the detecting device receives instructions from either the contraband monitoring device 170 or another device 1-7 to perform a corrective action to prevent operation of the contraband device. The corrective operations include transmitting a jamming signal, activating an audio and/or video recording to gather further information about the contraband device, or alerting and/or instructing another device, such as one or more of devices 1-7, to perform one or more intervention operations. In embodiments, the corrective action itself is taken in step 580. Both steps 570 and 580 are performed by devices other than the original detecting device to transmit jamming signals into a wider area to prevent usage of the contraband device.

Figure 6:
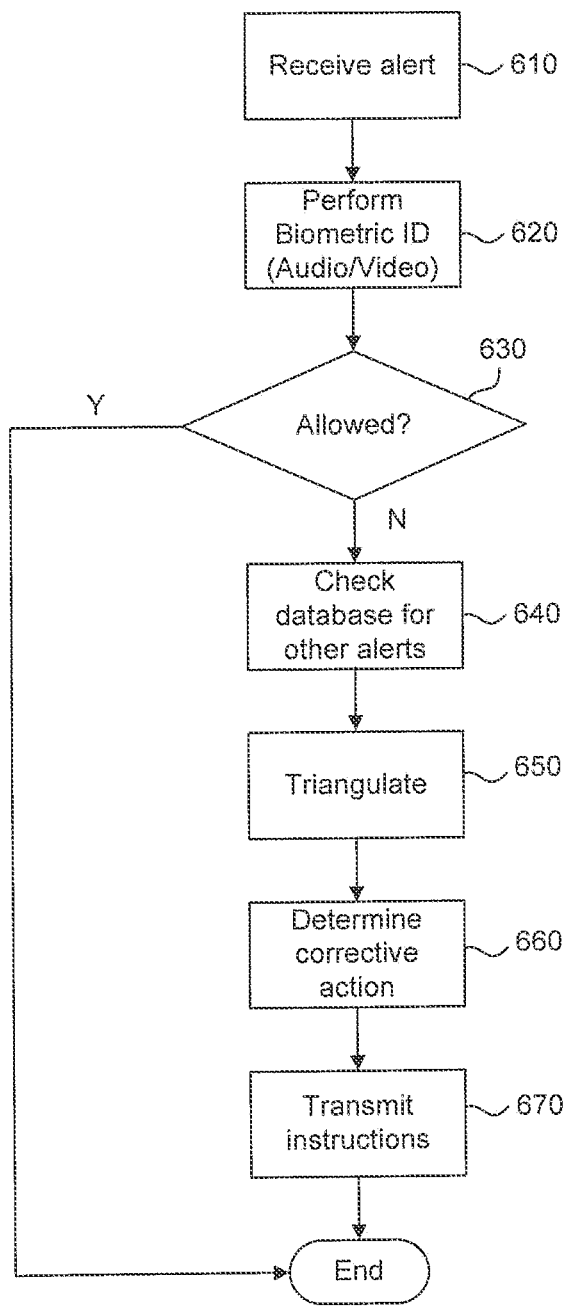
FIG. 6 illustrates the operational flow for a contraband monitoring center to detect and locate a contraband device, according to an exemplary embodiment of the present disclosure.

FIG. 6 depicts a flowchart 600 of the operations performed by the contraband monitoring center 300 to detect, monitor, and locate a contraband device 140 according to exemplary embodiments. When appropriate, the operations of flowchart 600 are described with reference to the contraband monitoring system 300 of FIG. 3.

In step 610, the contraband monitoring center receives an alert from a mobile device 1-3 or wireless access points 4-7. In embodiments, this alert includes several pieces of information related to the detection, such as GPS coordinates, location within the facility, RSSI, and biometric samples. The contraband monitoring center also updates all of its component servers as necessary based on the information received. For example, the location of the device sending the alert is updated in the location server 350, and the alert information is stored in alert server 320. In embodiments where the detecting device performs a triangulation using alerts received from other mobile or wireless access points, the triangulated location of the contraband device is also received as part of the alert.

In step 620, the contraband monitoring center performs a biometric identification operation if biometric data is sent as part of the alert to determine the identity of the contraband device user and determine if further action needs to be taken. In embodiments, there may be parties that are allowed to have non-sanctioned devices in the correctional facility, such as personnel of the facility carrying personal devices within the facility grounds. Step 620 is therefore a first measure to weed out potential false alarms in contraband device alerts. To perform the biometric identification operations, the contraband monitoring center will utilize its biometric server 330 to perform voice and facial recognition matching software according to well-known methodologies for biometric validation.

In step 630, if the biometric validation operation of step 620 determines that the detected device is allowed or is in some way a false alarm (630Y), the contraband monitoring center ends its operations. If step 620 does not determine that the detected device is allowed (630N), the contraband monitoring center initiates processing for determining the location of the device and instructions for corrective actions. In embodiments where the detecting device performs triangulation, the contraband monitoring center 300 foregoes any steps related to triangulating the location of the contraband device and moves to determine corrective action in step 660.

Beginning in step 640, the contraband monitoring center checks the alert database 320 for alerts that have occurred in a similar time frame and within proximity to the alert received in step 610. In embodiments, the time frame varies from only 1 second to several minutes depending on the input from correctional facility administrators. Depending on the location data received in the alert, the contraband monitoring center uses different methods to determine which alerts (if any) stored in the alert database are pertinent to the received alert. For example, if GPS coordinates are available in the alert, these coordinates are compared to the GPS coordinates of alerts stored in the alert database 320. If only wireless access point information is available (i.e. the wireless access point that is used to send the alert to the contraband monitoring center), then other alerts with the same wireless access point or other wireless access points in the vicinity are considered. If correctional facility location information is available (such as "library" or "cafeteria"), then other alerts with that same information are considered alongside the received alert.

In step 650, the received alert information and the alerts identified in step 640 are used to perform triangulation to determine the location of the contraband device. The triangulation techniques applied here are similar to those applied by a detecting device in step 555 depicted in FIG. 5. Triangulation techniques will be described in greater detail related to FIG. 7.

In step 660, a corrective action is determined based on the determined location of the contraband device. In embodiments, the corrective actions include transmitting a jamming signal, activating an audio and/or video recording to gather further information about the contraband device, or alerting and/or instructing another device, such as one or more of devices 1-7, to perform one or more intervention operations. The contraband monitoring device must also determine which devices to instruct to take these corrective actions. At step 670, instructions for the corrective actions determined in step 660 are transmitted to the devices determined in step 660.

Referring back to FIG. 5, in embodiments, the instructions for the corrective actions are received by one or more devices in the correctional facility in step 570, having been determined by the contraband monitoring center in step 660 of FIG. 6. In step 580, the corrective actions are executed by one or more devices in the correctional facility. Both steps 570 and 580 may be taken by any of the devices 1-7 in the correctional facility 110, rather than just a device that detected the contraband device 140, since several corrective actions require the cooperation of multiple devices within the facility to achieve their desired effect of disrupting contraband device communications.

Figure 7A:
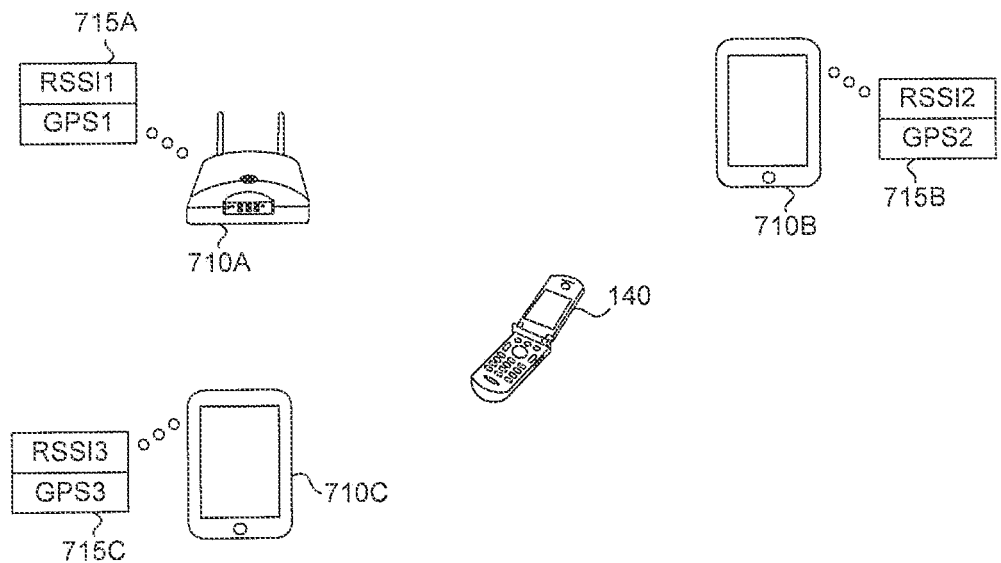
FIG. 7A-7C illustrates several examples of triangulation to determine the location of a contraband device, according to an exemplary embodiment of the present disclosure.
Figure 7B:
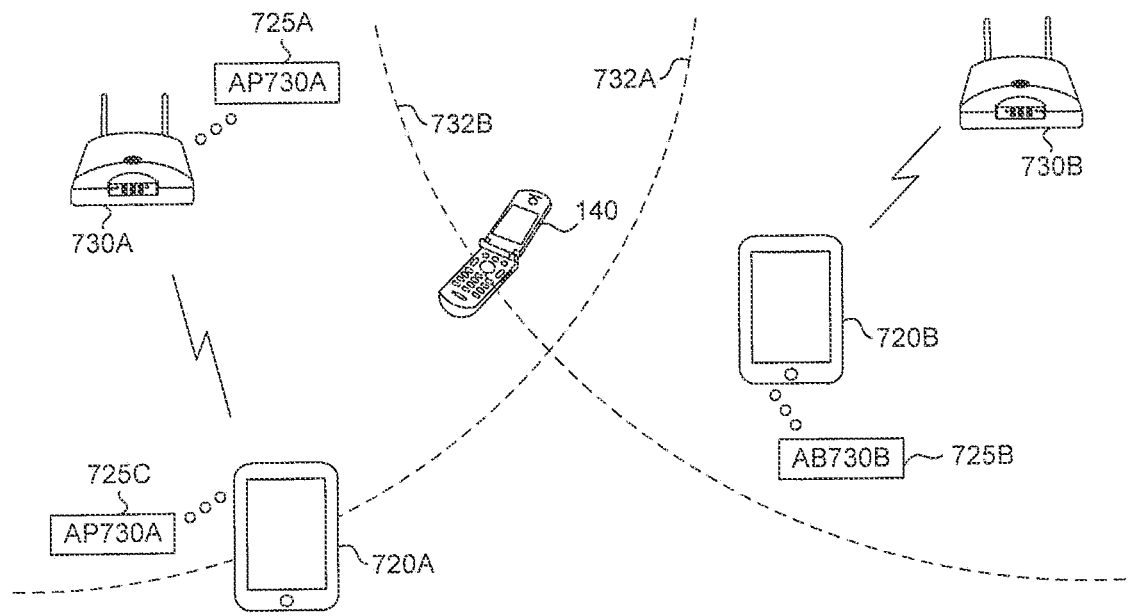
Figure 7C:
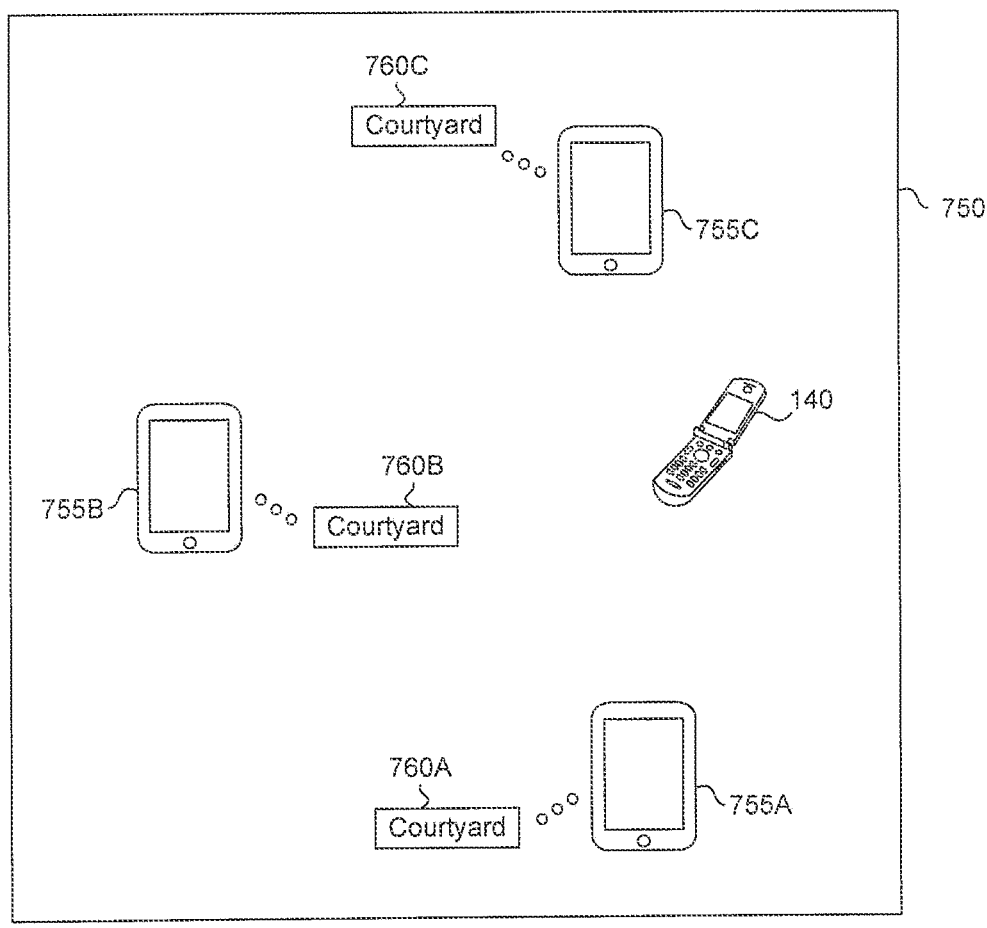

FIGS. 7A-7C illustrate several examples of triangulating a contraband device location based on the detections of multiple detecting devices. In such scenarios, triangulation techniques that use the data available at each of the detecting devices may be very effective in "localizing" the contraband device to within a small area. Each figure depicts a different scenario where several detecting devices detect a single contraband device, and options for determining the location are discussed for each case. However, these scenarios are exemplary embodiments and should not be considered limiting to the different types of triangulation that may be performed by either the detecting devices or the contraband monitoring center. Such techniques would be applied in the triangulation steps depicted in steps 555 and 650 of FIG. 5 and FIG. 6 respectively. These embodiments are illustrative of simple cases of triangulation using alerts from multiple devices; combinations of techniques described in any of these scenarios are used depending on what data is available to the detecting devices at the time of detection.

FIG. 7A depicts an embodiment in which GPS coordinates are available to all detecting devices. This scenario occurs in an outdoor area such as a courtyard or a recreational area where GPS signals may be readily available to the detecting devices. FIG. 7A depicts three devices which have detected a contraband device 140, a wireless access point 710A, two mobile devices 710B and 710C. Each detecting device generates an alert, depicted by 715A, 715B, and 715C, which contain at least two data points: a GPS coordinate of the detecting device at the time of detection and a received signal strength indicator (RSSI) value of the contraband device. The alerts also contain other data that is conducive to locating contraband device 140, such as time of arrival (the timestamp of the alert) and "angle of arrival."

Using the data points from each device, several triangulation techniques are available. One method for determining location simply averages together the locations of the detecting devices 710A-C to determine a probable location of the contraband device 140. More generally, the area within the three points described in "GPS1", "GPS2" and "GPS3" within the three alerts 715A-C may give a more general area where the contraband device is located. In such cases, correctional facility personnel could be sent to a small area determined in the triangulation to attempt to apprehend the party using the contraband device. Other, more precise methods combine "ranging" techniques, in which a distance is estimated between the contraband device 140 and each detecting device 710A-C, with "trilateration" or "angulation" techniques to obtain the estimated location of the device.

Several ranging techniques are available depending on the capabilities of the detecting devices. In one technique, the RSSI is used to estimate a distance between each detecting device 710A-C and the contraband device 140. When the detecting devices are always scanning (i.e. the wait time is zero for each device), each detecting device determines a "time of arrival" (TOA), the time that each detecting device 710A-C detects a transmission from the contraband device 140. Those TOAs are then compared to estimate how far each detecting device is from the contraband device based on basic signal propagation concepts. In cases where detecting devices 710A-C have directional antennae capabilities, an "angle of arrival" (AOA) technique may be used in which each detecting device 710A-C is capable of determining the angle from which the contraband device signal arrives at the detecting device. The data required for these different ranging techniques may all be included in the alerts 715A-C depending on the capabilities of the devices.

Trilateration techniques involve determining the intersecting points or areas of circles around each detecting device 710A-C, where the intersecting points or areas represent the possible locations of the contraband device 140 that could produce the distance measurements determined for each of the detecting devices. These techniques require at least three detecting devices. These techniques are appropriate when ranging techniques based on RSSI or TOA are used, where these ranging techniques are used to calculate the distance between the contraband device and a detecting device, but cannot determine from which direction the contraband device signal is arriving.

In embodiments, the distance to between the contraband device and each detecting device 710A-C is calculated using RSSI under an assumed transmit power of the contraband device. Then trilateration techniques would be used to determine the contraband device location based on the calculated distances. The calculated distances may not result in a viable location. In many instances, the distances calculated will not result in intersecting points between all of the circles surrounding each detecting device. Therefore, this process would be reiterated using different transmit powers until a viable location was determined. In another embodiment, the distance between the contraband device and each detecting device is calculated using TOA under an assumed time of transmission by the contraband device. Reiterations are performed in the same manner under different assumed times of transmission until a viable location is determined.

Angulation techniques are used to determine a location based on the AOA at each detecting device, where the location of the contraband device is determined by finding the intersection of lines drawn along the angle of arrival from the GPS location of each detecting device.

In FIG. 7B, a scenario is depicted in which the detecting devices do not have a GPS signal available, and therefore have to rely on the less informative data point of either location within the facility (not pictured) or the wireless access point to which they are connected to. In this scenario, the wireless access points serve as general markers for the location of the detecting devices, as these access point devices are typically in a fixed location within the facility, and inferences are made as to where the contraband device based on which wireless access points each of the detecting devices are connected to. In the figure, there are two wireless access points 730A and 730B. Wireless access points 730A and 730B are assumed to have limited coverage's, depicted by the dotted lines 732A and 732B respectively. Mobile device 720A is connected to wireless access point 730A, and mobile device 720B is connected to wireless access point 730B.

In this scenario, mobile devices 720A and 720B and wireless access point 730A all detect the presence of a contraband device 140 and send alerts depicted as 725A, 725B, and 725C to each other or to a contraband monitoring center depicted as system 300. Wireless access point 730B does not detect the contraband device and therefore has no corresponding alert generated. The alerts do not contain GPS coordinates but instead contain only the info of which wireless access point they are connected to. Mobile device 720A is connected to wireless access point 730A (depicted as text "AP730A" in alert 725C), mobile device 720B is connected to wireless access point 730B (depicted as text "AP730B" in alert 725B), and the wireless access point 730A, which also detects the contraband device, simply states itself as the wireless access point in alert 725A. Thus, among the three detections made by three separate detecting devices, two devices (mobile device 720A and wireless access point 730A) report wireless access point 730A, and one reports wireless access point 730B.

From this scenario several basic triangulation steps may be taken. For example, the contraband device is in range of devices that are connected to both wireless access points 730A and 730B, so a region of the correctional facility in which there is coverage overlap of the two access points (such as the overlap region of coverage areas 732A and 732B depicted in FIG. 7B) may be used to identify a small area within the correctional facility that facility personnel searches for a contraband device. In some embodiments, a scoring system is used that identifies that the contraband device is closer to wireless access point 730A (as two of the three alerts identify that access point), and further weight still may be given to alert 725A because it shows that the wireless access point 730A has itself detected the contraband device.

In FIG. 7C, a detection scenario is illustrated in a designated area 750 of the correctional facility. In embodiments, mobile devices determine which designated area of a correctional facility they are in based on several pieces of information, such as which access point they are connected to or from video that is taken at the time of an alert. In such instances, information of that designated area, such as "courtyard," "recreation room," "cafeteria," etc., is useful in triangulating the location of a contraband device. In FIG. 7C, within the designated area 750, three mobile devices 755A, 755B, and 755C, all detect a contraband device 140. The alerts generated by the three devices, 760A, 760B, and 760C, all contain information about the designated area 750 in which they are currently located, in this case the "courtyard." This information is used by the party performing the triangulation to obtain this location, which then limits any search by correctional facility personnel performed to just that area. Instructions are also be sent by the contraband monitoring center to every device in the "courtyard" area to perform a jamming operation, or to perform additional monitoring to obtain more precise information on the location of the contraband device. As noted above, FIGS. 7A-7C are illustrative, and are not meant to be limiting. Detecting devices may produce heterogeneous alert information, and thus, combinations of techniques as described above may be appropriate in determining the location of the contraband device. These techniques, or some combination of them depending on the information available in each alert, may be performed by either a detecting device or the contraband monitoring center in steps 555 or 650 of FIGS. 5 and 6.

Figure 8:
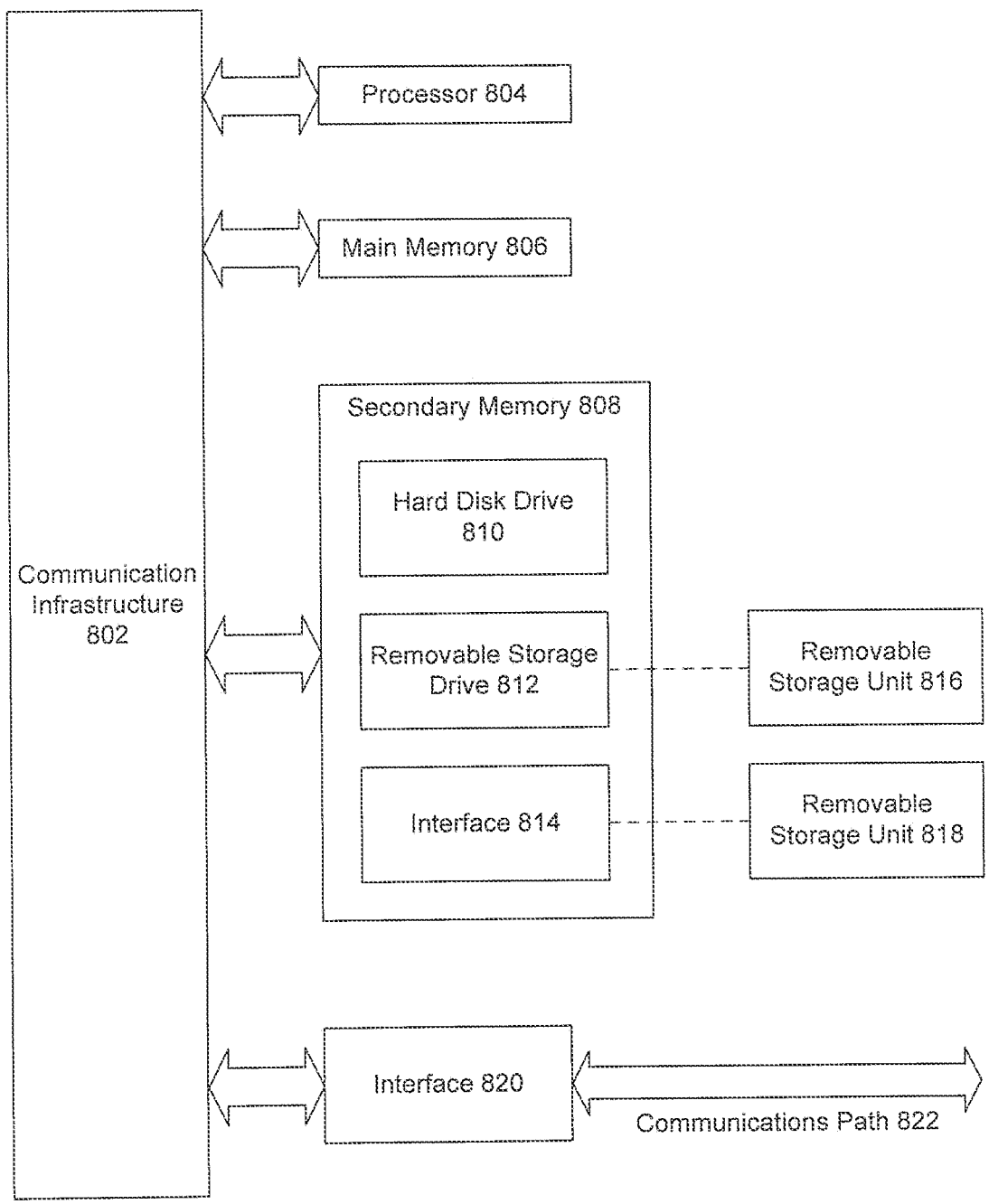
FIG. 8 illustrates a computer system, according to an exemplary embodiment of the present disclosure.

FIG. 8 depicts a computer system 800 which can be used to implement It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

The following description of a general purpose computer system is provided for the sake of completeness. Embodiments of the present disclosure can be implemented in hardware, or as a combination of software and hardware. Consequently, embodiments of the disclosure are implemented in the environment of a computer system or other processing system. For example, the method of FIGS. 5-6 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A contraband monitoring center comprising:
   a memory; and
   at least one processor coupled to the memory and configured to:
      receive an alert from a first mobile device, wherein the alert includes first location information of a contraband device;
      determine a location of the first mobile device based on the alert;
      identify a second mobile device based on the location of the first mobile device;
      send an instruction to the second mobile device, wherein the instruction configures the second mobile device to scan a surrounding area of the second mobile device for the contraband device;
      receive a second alert from the second mobile device, wherein the second alert includes second location information of the contraband device; and
      determine a location of the contraband device based on the first location information and the second location information.

2. The contraband monitoring center of claim 1, wherein the alert further includes a current location of the first mobile device.

3. The contraband monitoring center of claim 1, wherein to identify the second mobile device based on the location of the first mobile device, the at least one processor is further configured to determine that the second mobile device is in close proximity to the first mobile device.

4. The contraband monitoring center of claim 1, wherein the at least one processor is further configured to:
   transmit a corrective instruction to the first mobile device, wherein the corrective instruction configures the first mobile device to transmit a jamming signal to the contraband device.

5. The contraband monitoring center of claim 4, wherein the jamming signal includes a corruption signal that replaces portions of packets transmitted by the contraband device and received by the first mobile device.

6. The contraband monitoring center of claim 1, wherein the at least one processor is further configured to transmit a corrective alert to a correctional facility, wherein the corrective alert requests personnel to be sent to search for the contraband device.

7. The contraband monitoring center of claim 1, wherein the instruction further includes a wake-up signal that turns the second mobile device on from a low-power mode or a power-off mode.

8. A method of a contraband monitoring center, the method comprising:
   receiving an alert from a first mobile device, wherein the alert includes first location information of a contraband device;
   determining a location of the first mobile device based on the alert;
   identifying a second mobile device based on the location of the first mobile device;
   sending an instruction to the second mobile device, wherein the instruction configures the second mobile device to scan a surrounding area of the second mobile device for the contraband device;
   receiving a second alert from the second mobile device, where in the second alert includes second location information of the contraband device; and
   determining a location of the contraband device based on the first location information and the second location information.

9. The method of the contraband monitoring center of claim 8, wherein the alert further includes a current location of the first mobile device.

10. The method of the contraband monitoring center of claim 8, wherein the identifying the second mobile device based on the location of the first mobile device further comprises determining that the second mobile device is in close proximity to the first mobile device.

11. The method of the contraband monitoring center of claim 8, further comprising transmitting a corrective instruction to the first mobile device, wherein the corrective instruction configures the first mobile device to transmit a jamming signal to the contraband device.

12. The method of the contraband monitoring center of claim 11, wherein the jamming signal includes a corruption signal that replaces portions of packets transmitted by the contraband device and received by the first mobile device.

13. The method of the contraband monitoring center of claim 8, further comprising transmitting a corrective alert to a correctional facility, wherein the corrective alert requests personnel to be sent to search for the contraband device.

14. The method of the contraband monitoring center of claim 8, wherein the instruction further includes a wake-up signal that turns the second mobile device on from a low-power mode or a power-off mode.

15. A non-transitory computer-readable device having instructions stored thereon that, when executed by at least one computing device, cause the at least one computing device to perform operations comprising:
   receiving an alert from a first mobile device, wherein the alert includes first location information of a contraband device;
   determining a location of the first mobile device based on the alert;
   identifying a second mobile device based on the location of the first mobile device;
   sending an instruction to the second mobile device, wherein the instruction configures the second mobile device to scan a surrounding area of the second mobile device for the contraband device;
   receiving a second alert from the second mobile device, where in the second alert includes second location information of the contraband device; and
   determining a location of the contraband device based on the first location information and the second location information.

16. The non-transitory computer-readable device of claim 15, wherein the alert further includes a current location of the first mobile device.

17. The non-transitory computer-readable device of claim 15, wherein the identifying the second mobile device based on the location of the first mobile device further comprises determining that the second mobile device is in close proximity to the first mobile device.

18. The non-transitory computer-readable device of claim 15, wherein the operations further comprise transmitting a corrective instruction to the first mobile device, wherein the corrective instruction configures the first mobile device to transmit a jamming signal to the contraband device.

19. The non-transitory computer-readable device of claim 18, wherein the jamming signal includes a corruption signal that replaces portions of packets transmitted by the contraband device and received by the first mobile device.

20. The non-transitory computer-readable device of claim 15, wherein the operations further comprise transmitting a corrective alert to a correctional facility, wherein the corrective alert requests personnel to be sent to search for the contraband device.

* * * * *

UNITED STATES PATENT AND TRADEMARK OFFICE
CERTIFICATE OF CORRECTION

PATENT NO. : 11,778,417 B2
APPLICATION NO. : 17/876019
DATED : October 3, 2023
INVENTOR(S) : Hodge Page 1 of 1

It is certified that error appears in the above-identified patent and that said Letters Patent is hereby corrected as shown below:

In the Specification

In Column 2, Line 18, delete "FIG." and insert -- FIGS. --, therefor.

In the Claims

In Column 19, Claim 8, Line 27, delete "where in" and insert -- wherein --, therefor.

In Column 20, Claim 15, Line 23, delete "where in" and insert -- wherein --, therefor.

Signed and Sealed this
Twenty-first Day of November, 2023

Katherine Kelly Vidal
*Director of the United States Patent and Trademark Office*